April 11, 1939.   F. COETERIER ET AL   2,153,614
OPTICAL IMAGE REPRODUCER
Filed Dec. 24, 1936
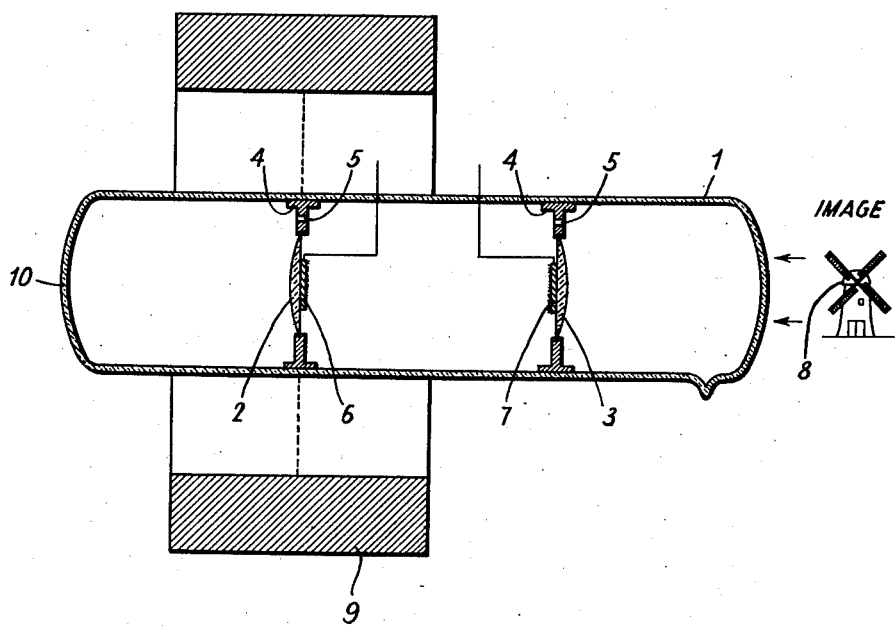
INVENTORS
FREDERIK COETERIER
MARTIN CORNELIS TEVES
BY
ATTORNEY Patented Apr. 11, 1939

2,153,614

UNITED STATES PATENT OFFICE 2,153,614

OPTICAL IMAGE REPRODUCER

Frederik Coeterier and Marten Cornelis Teves, Eindhoven, Netherlands, assignors to N. V. Philips' Gloeilampenfabrieken, Eindhoven, Netherlands, a corporation of the Netherlands Application December 24, 1936, Serial No. 117,441 In Germany December 30, 1935

9 Claims. (Cl. 250—169)

This invention relates to an electric device in which a picture set up by electrons is projected on a projection surface.

Such a picture may be obtained, for example, by photo-electric emission. If a luminous picture of a body is thrown on a photo-electric electrode of even sensitiveness, the number of electrons emitted by a given part of the electrode is dependent upon the intensity of the light to which the said part is exposed. Thus, the beam of electrons emitted by the entire electrode has an intensity distribution corresponding to the local exposure of the electrode, which consequently emits a picture set up by electrons.

In the case of even exposure of a photo-electric electrode having a locally uneven sensitiveness, the picture set up by electrons is a reproduction of the local sensitiveness of the electrode.

The picture may also be obtained by thermionic emission. If the surface of an incandescent cathode is evenly heated the picture set up, for example, by the electrons emitted is a reproduction of the local thermionic sensitiveness of the surface of the cathode.

It is known to project electrons setting up such a picture to a projection surface under the influence of an electric field. The electrons impinge on this surface in a distribution which may wholly correspond to the electron distribution of the original picture. This electron distribution of the beam of electrons that impinges on the projection surface consequently represents an image of the original picture set up by electrons. This image may be enlarged or diminished as compared with the said original picture and may often be distorted.

Hereinafter such an original picture will be referred to as "primary picture set up by electrons" or briefly as "primary picture" and the image formed on the projection surface as "secondary image set up by electrons" or briefly "secondary image".

It has already been proposed to subject the electrons on their way from the primary picture to the projection surface to the influence of a magnetic field. For this purpose, the discharge path is partly surrounded by a magnetic coil frequently referred to as a magnetic electron lens which is so arranged and proportioned that the magnetic field has a focussing effect on the beam of electrons and thus assists in obtaining a greater similarity of the secondary image to the primary picture.

When a single magnet coil is used rotation of the secondary image occurs. Stabenow describes, for example, in the "Zeitschrift fur Physik", vol. 96, pages from 634 to 642 a rotation of the secondary image relatively to the reversed (that is to say rotated by 180°) primary picture. With certain geometrical arrangements of the plane of the primary picture, of the projection surface and of the magnet coil, the rotation does not ensue relatively to the reversed primary picture but relatively to the primary picture itself.

Stabenow described that this rotation can be avoided by the use of two magnet coils producing oppositely directed magnetic fields.

The invention has for its object to avoid in a more simple manner the rotation of the secondary image.

The device according to the invention comprises an annular permanent magnet which surrounds only part of the path between the primary picture and the projection surface and which is so shaped and arranged that the secondary image is not rotated relatively to the primary picture or to the reversed primary picture.

It has been found that a single permanent magnet ensures the same effect as the two magnet coils described by Stabenow. This might be explained as follows, the explanation being, however, given with all reserve:

With a magnet coil the magnetic lines of force throughout the length of the coil axis have the same direction which is not the case with an annular permanent magnet since the lines of force starting from the poles pass partially through the aperture of the magnet but partially also around the magnet at the outside. According to Stabenow image rotation does not occur when the integral of the magnetic field intensity along the axis of the magnet is equal to zero. Since the magnetic field in the axis of an annular permanent magnet varies in direction, the form of a single permanent magnet may be such that the said integral is equal to zero.

Since the rotation of the secondary image is also dependent upon the electric voltage between the electrodes, potential variations bring about variations in rotation which may render the secondary image undefined. Since in the device according to the invention, rotation does not occur, potential variations do not exercise any influence on it so that it is even possible to apply an alternating voltage between the electrodes.

The correct shape and arrangement of the annular permanent magnet can be simply ascertained in any practical case by calculation and tests. It is generally to be taken into consideration that the aperture of the annular magnet is substantially larger than the primary image.

In order that the invention may be clearly understood and readily carried into effect a device according to the invention permitting of favorable results being obtained will now be described more fully, by way of example, with reference to the accompanying drawing.

The device shown diagrammatically in the single figure of the drawing comprises an exhausted cylindrical glass tube 1 which has arranged in it normally to its axis two plane-convex lenses 2 and 3 having their plane sides turned to each other. These lenses are set in rings 4 bearing on the tube wall ond provided with small apertures 5 assisting the exhaustion of the tube.

The central part of the plane side of the lens 2 has arranged on it a photo-electrode 6 which may be constituted in known manner by a silver film coated with a layer of a mixture of silver particles and caesium oxide particles and of caesium which has a thin caesium film absorbed to it. This photo-electric electrode is provided with a leading-in wire led from the tube.

The lens 3 is provided at the central part of its plane side with an anode 7 constituted by a metal film, for example, of silver, which has mounted on it a thin film of a substance which fluoresces when struck by electrons. This substance is, for example, fluorescent zinc-silicate. This anode is also provided with a leading-in wire led from the tube which permits of a source of direct current, for example, of 5000 volts, being interconnected between the cathode 6 and the anode 7.

The spacing between the lenses 2 and 3 and the shape of the lens 3 are such that the border-part of the lens 3 which is not covered by the anode 7 throws on the photo-electric cathode 6 a luminous image of some body 8. The light rays cause this cathode to emit electrons, the emission of every part of the cathode being dependent upon the intensity of the light to which this part is exposed. The luminous image is thus converted by the cathode into a picture set up by electrons.

The electrons emitted pass under the influence of the electric field to the anode 7 on which a secondary image set up by electrons is obtained. The electrons impinge on the fluorescent substance applied to the anode, the intensity of the fluorescent rays emitted by every part of the anode being dependent upon the intensity of the beam of electrons which impinges on the said part. The secondary image is thus converted on the anode into an image of fluorescent rays. A transformation of the luminous image thrown on the cathode into the image set up by the fluorescent ray is thus obtained. Since the wave length of the luminous rays that set up the first image generally differs from that of the fluorescent rays, the device acts as a transformer of wave lengths. The image thrown on the photo-electric cathode may be set up, for example, by invisible (infra-red ultra-violet) rays and can be converted into a visible image by the use of a fluorescent substance the fluorescent rays of which are comprised in the visible region. The fluorescent image can be observed across the tube end 10 and the border part of the lens 2 which is not covered by the cathode 6.

The tube 1 is surrounded by an axially arranged annular permanent magnet 9 which surrounds in part the discharge path between the cathode 6 and the anode 7. This permanent magnet serves for focussing the electron beam so that a more defined image is obtained on the anode.

The shape and the arrangement of this magnet are such that the secondary image formed on the anode is not rotated relatively to the primary electron picture. This result can be obtained by the following dimensions of the device.

Spacing between the lenses 2 and 3____mm__ 100
Diameter of these lenses_____mm__ 40
Diameter of the cathode and of the anode
                                       mm__ 20
Internal and external diameter of the magnet_____ 150 and 210 mm respectively
Length of this magnet_____mm__ 100

The magnet 9 is so arranged that its plane of symmetry coincides with the plane of the plane side of the lens 2. The maximum field intensity in the axis of the magnet is 1000 gauss. In this case, the internal diameter of the magnet is consequently nearly 8 times as large as the diameter of the photo-cathode.

The photo-electric electrode may also be constructed in such manner that the luminous rays can be thrown onto that side of the photo-electric cathode which is remote from the anode. In this case the construction must permit of these rays penetrating to the photo-electric material. As an alternative, the anode may be transparent to fluorescent rays so that the fluorescent image can be observed on the rear side of the anode.

The primary picture need not always be formed photo-electrically. Thus, for example, it is possible to form a secondary image of a primary picture set up by thermionic electron emission. The secondary image need also not always be used for setting up a fluorescent image but may be used for other purposes, for example, be impressed photographically. For this purpose, the electrons may be caused to impinge directly on a photographic plate.

If the secondary image is formed on an auxiliary electrode capable of emitting secondary electrons, the secondary image may in turn be converted into an intensified image set up by electrons and a picture may be formed from this image on a projection surface, the electron image emitted by the auxiliary electrode playing consequently the part of a primary picture.

The secondary image need not always be formed on the anode or on another electrode. It is also possible to make the arrangement such that the projection surface does not coincide with one of the electrodes of the device.

What we claim is:—

1. An optical image reproducing device comprising photoelectric means for transforming an optical image into an electron image, means for focussing the image to be reproduced onto said photoelectric means, means adapted to fluoresce under the action of electronic bombardment, and a permanent magnet adjacent the aforementioned photoelectric means for focussing the electronic image onto the aforementioned fluorescing means.

2. An optical image reproducing device comprising photoelectric means for transforming an optical image into an electron image, means for focussing the image to be reproduced onto said photoelectric means, means adapted to fluoresce under the action of electronic bombardment, and a permanent magnet adjacent to and partially surrounding the aforementioned photoelectric means and extending over a portion of the path between said photoelectric means and the fluorescing means, for focussing the electron image onto the fluorescing means.

3. An optical image reproducing device comprising photoelectric means for transforming an optical image into an electron image, means for focussing the image to be reproduced onto said photoelectric means, means adapted to fluoresce under the action of electronic bombardment, and a permanent magnet adjacent to and partially surrounding the aforementioned photoelectric means with the photoelectric means mounted at a position on the axis of the magnet, said magnet extending over a portion of the path between said photoelectric means and the fluorescing means.

4. An optical image reproducing device comprising optical means for focussing said image to be reproduced, fluorescing means mounted on said optical means, optical means for projecting fluorescent images formed on said fluorescing means, photoelectric means mounted on said latter optical means, and a permanent magnet at least partially surrounding said latter optical means, and partially surrounding the path between the aforementioned fluorescing means and the aforementioned photoelectric means, the axis of said magnet being coincident with one of the faces of the optical means on which the photoelectric means is mounted.

5. An optical image reproducer comprising a pair of plano-convex lenses mounted with their plane faces facing each other, an electrode joined to each of said lenses adapted to be biased, photoelectric means mounted on one of said electrodes for transforming the optical image in an electron image, means adapted to fluoresce under electron bombardment mounted on the electrode remote from the photoelectric means, and a permanent magnet surrounding said photoelectric means for focussing the electron image onto the fluorescing means.

6. An optical image reproducer comprising an envelope, a pair of plano-convex lenses mounted with their plane faces facing each other, a ring mounting for each of said lenses adapted to engage the wall of said envelope, an electrode joined to each of said lenses adapted to be biased, photoelectric means mounted on one of said electrodes for transforming the optical image into an electron image, means adapted to fluoresce under electron bombardment mounted on the electrode remote from the photoelectric means, and a permanent magnet surrounding said photoelectric means for focussing the electron image onto the fluorescing means.

7. An optical image reproducer comprising a pair of plano-convex lenses mounted with their plane faces facing each other, a silver electrode joined to each of said lenses adapted to be biased, photoelectric means mounted on one of said electrodes for transforming the optical image into an electron image, means adapted to fluoresce under electron bombardment mounted on the electrode remote from the photoelectric means, and a permanent magnet surrounding said photoelectric means for focussing the electron image onto the fluorescing means.

8. An optical image reproducer comprising a pair of plano-convex lenses mounted with their plane faces facing each other, an electrode mounted on one of said lenses on the plane face thereof and adapted to be biased, photoelectric means deposited on said electrode for converting the optical image into an electron image, a second electrode transparent to light of fluorescence mounted on the plane face of the lens remote from said photoelectric means and adapted to be biased, a fluorescing material deposited on said electrode, and a permanent magnet adjacent said photoelectric material for focussing the electron image onto the fluorescing material.

9. An optical wave length changer comprising photoelectric means for converting an optical image into an electron image, means for impressing onto said photoelectric means an optical image formed of light from one portion of the spectrum, means for fluorescing under electron bombardment, and a permanent magnet adjacent said photoelectric means for focussing said electron image onto said fluorescing means.

FREDERIK COETERIER.
MARTEN CORNELIS TEVES.